United States Patent
Trammell

(10) Patent No.: US 12,306,320 B2
(45) Date of Patent: May 20, 2025

(54) EMERGENCY BEACON AND LIGHT COMBINATION ASSEMBLY

(71) Applicant: Gregory Trammell, Tacoma, WA (US)

(72) Inventor: Gregory Trammell, Tacoma, WA (US)

(*) Notice: Subject to any disclaimer, the term of this patent is extended or adjusted under 35 U.S.C. 154(b) by 343 days.

(21) Appl. No.: 17/951,246

(22) Filed: Sep. 23, 2022

(65) Prior Publication Data

US 2024/0103115 A1  Mar. 28, 2024

(51) Int. Cl.
| | |
|---|---|
| G01S 5/02 | (2010.01) |
| G08B 5/38 | (2006.01) |
| H02J 7/35 | (2006.01) |
| H04W 4/02 | (2018.01) |
| H04W 4/029 | (2018.01) |
| H04W 4/90 | (2018.01) |

(52) U.S. Cl.
CPC .............. *G01S 5/0231* (2013.01); *G08B 5/38* (2013.01); *H02J 7/35* (2013.01); *H04W 4/027* (2013.01); *H04W 4/029* (2018.02); *H04W 4/90* (2018.02)

(58) Field of Classification Search
CPC ....... G01S 5/0231; H04W 4/029; H04W 4/90; H04W 4/027; G08B 5/38; H02J 7/35
USPC ...................................................... 455/404.1
See application file for complete search history.

(56) References Cited

U.S. PATENT DOCUMENTS

| | | |
|---|---|---|
| D263,170 S | 2/1982 | Maglica |
| 5,731,759 A | 3/1998 | Finucan |
| 8,297,775 B2 | 10/2012 | Wright |
| 8,313,209 B2 | 11/2012 | Connor |
| 9,651,208 B2 | 5/2017 | Sharrah |
| 10,060,582 B2 | 8/2018 | O'Brien |
| 2005/0167559 A1* | 8/2005 | Rivers .................... B25H 3/006 248/317 |
| 2009/0147505 A1 | 6/2009 | Robinett |
| 2012/0033416 A1* | 2/2012 | Ballard .................... F21L 4/027 362/202 |
| 2019/0197864 A1* | 6/2019 | Hui ..................... G08B 21/0453 |
| 2020/0326059 A1* | 10/2020 | Larrimore ............ F21V 21/145 |

FOREIGN PATENT DOCUMENTS

WO    WO201413074    8/2014

* cited by examiner

*Primary Examiner* — Maria El-Zoobi

(57) ABSTRACT

An emergency beacon for emitting a light in an emergency includes a hollow handle and a hollow head member removably attached to the handle. A head control circuit, a head power supply, and a light emitter are electrically coupled to each other and positioned within the head member. A head power button is operatively coupled to the head control circuit and positioned on a perimeter surface of the head member. The head control circuit is programmed for activating the light emitter to emit a light pattern when the head power button is actuated. A clip is attached to the head member which is configured for removably coupling to an article of clothing when the head member is detached from the handle.

19 Claims, 6 Drawing Sheets

EMERGENCY BEACON AND LIGHT COMBINATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to emergency beacons and more particularly pertains to a new emergency beacon and light combination assembly for emitting a light in an emergency.

(2) Description of Related Art Including Information Disclosed Under 37 CFR 1.97 and 1.98

The prior art relates to emergency beacons which emit light in an emergency. Several devices exist in the prior art for emitting an emergency light. However, the prior art does not disclose an emergency beacon and light combination assembly comprising a detachable head member which can clip onto an article of clothing.

BRIEF SUMMARY OF THE INVENTION

An embodiment of the disclosure meets the needs presented above by generally comprising a hollow handle and a hollow head member removably attached to the handle. A head control circuit, a head power supply, and a light emitter are electrically coupled to each other and positioned within the head member. A head power button is operatively coupled to the head control circuit and positioned on a perimeter surface of the head member. The head control circuit is programmed for activating the light emitter to emit a light pattern when the head power button is actuated. A clip is attached to the head member which is configured for removably coupling to an article of clothing when the head member is detached from the handle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
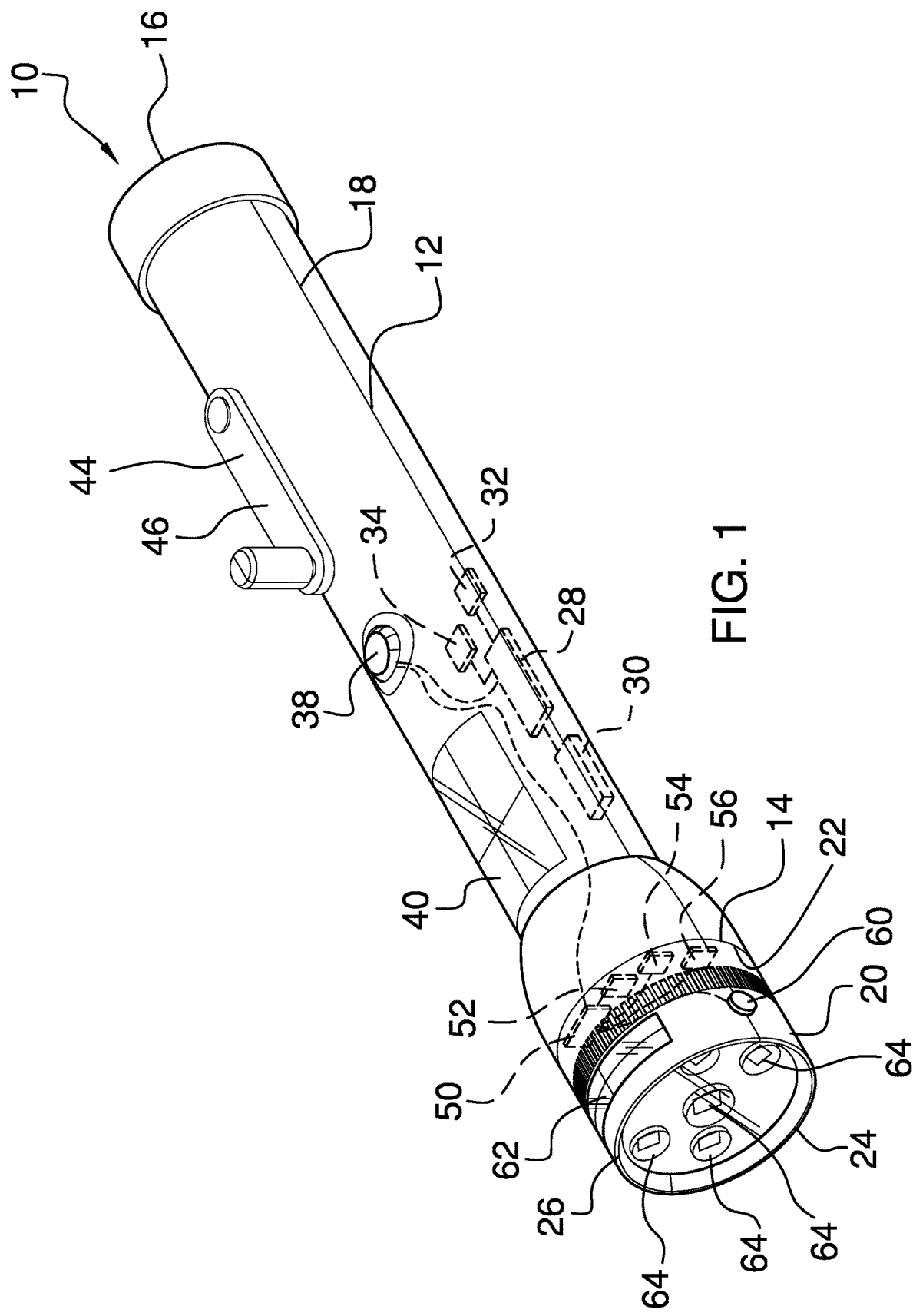
FIG. 1 is a perspective view of an emergency beacon and light combination assembly according to an embodiment of the disclosure.
Figure 2:
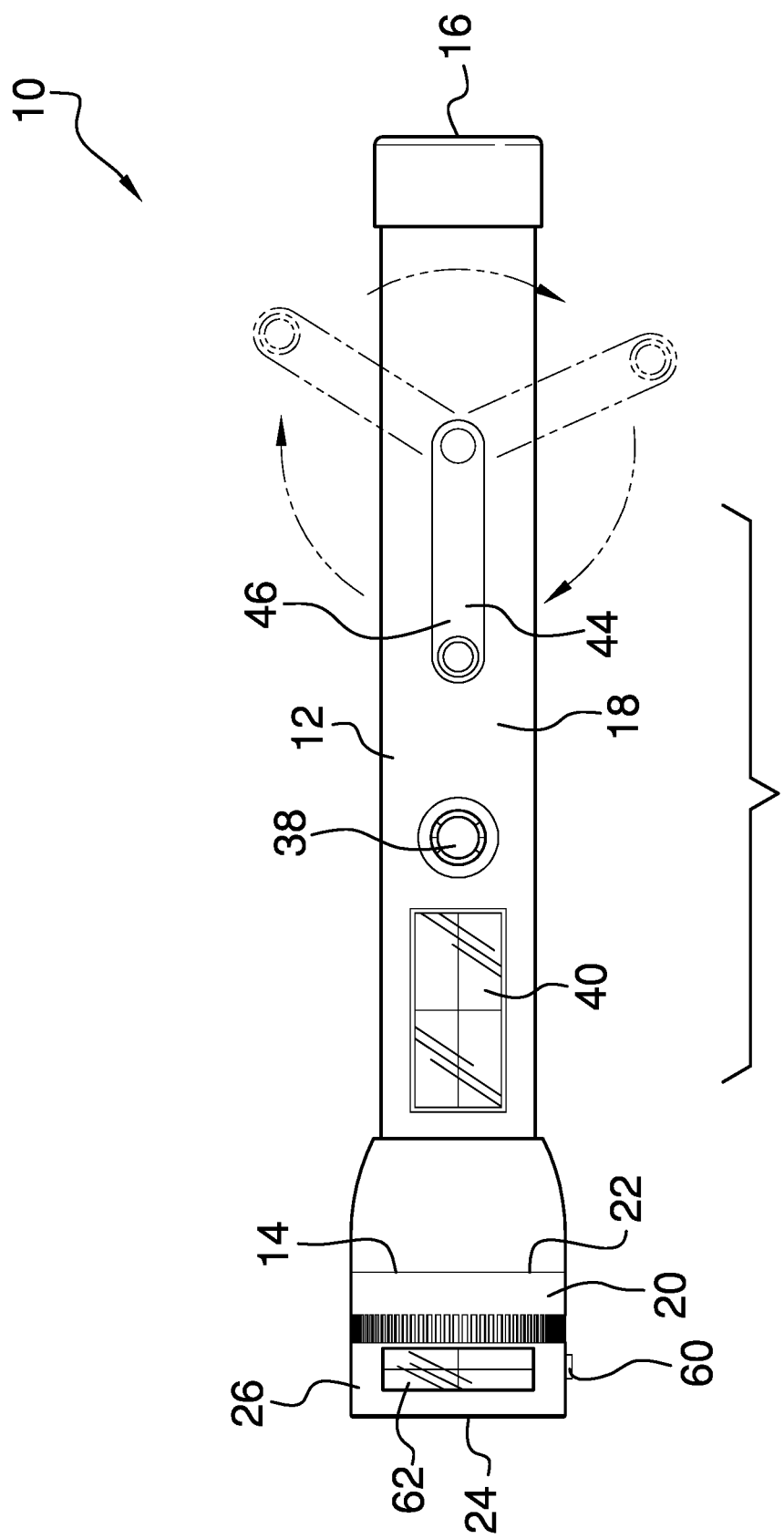
FIG. 2 is a top view of an embodiment of the disclosure.
Figure 3:
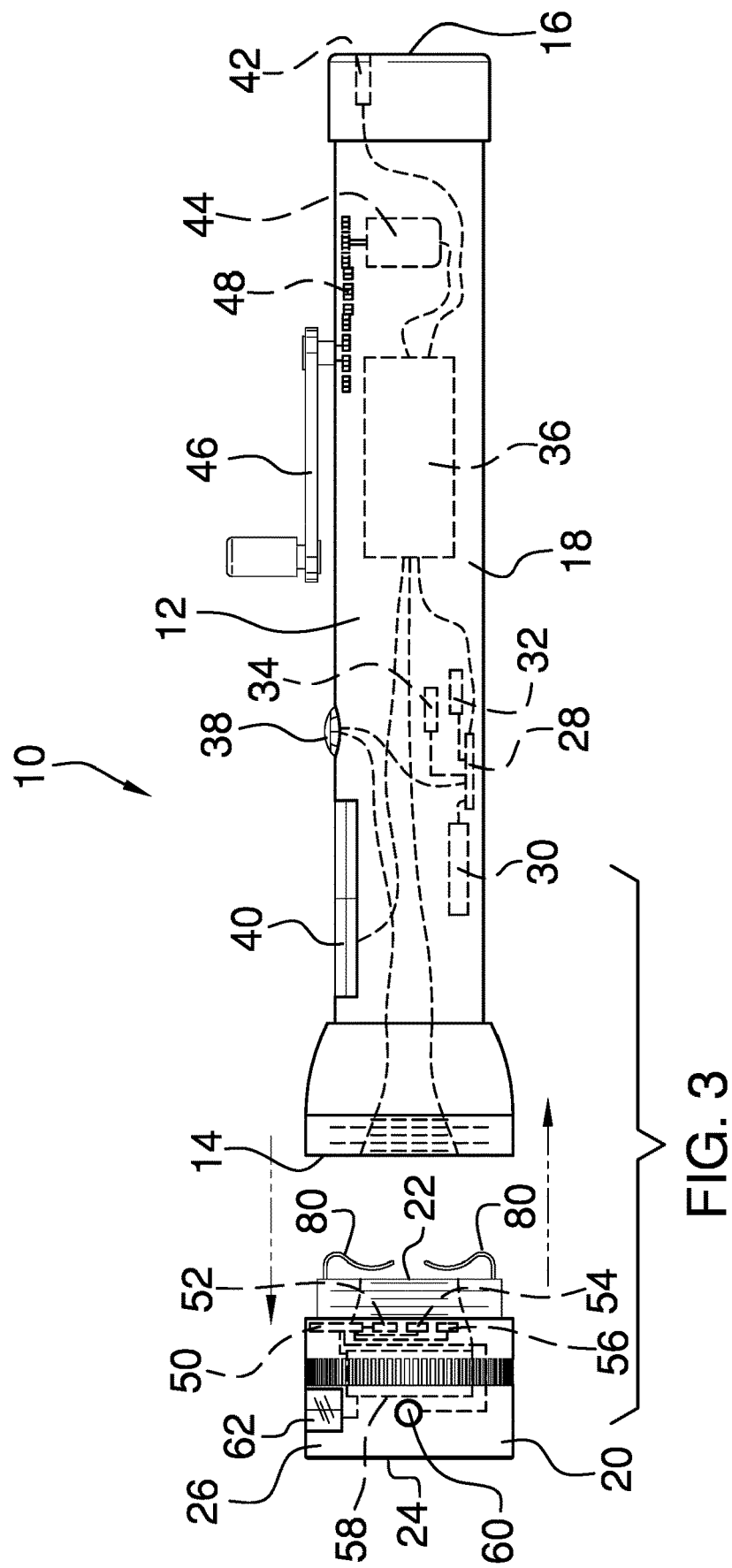
FIG. 3 is a side exploded view of an embodiment of the disclosure.
Figure 4:
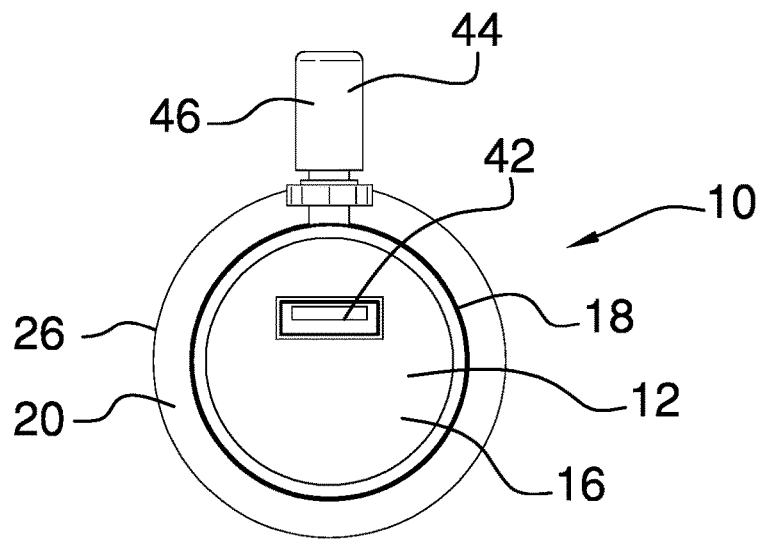
FIG. 4 is a back view of an embodiment of the disclosure.
Figure 5:
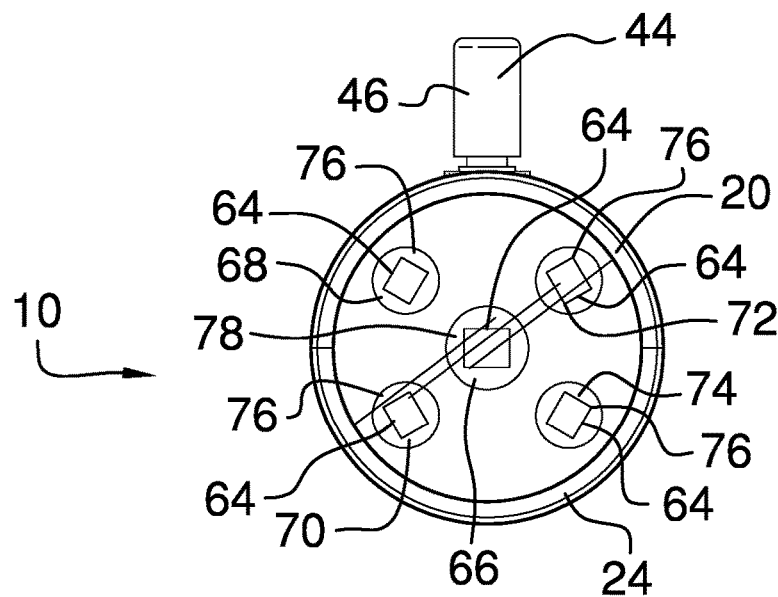
FIG. 5 is a front view of an embodiment of the disclosure.
Figure 6:
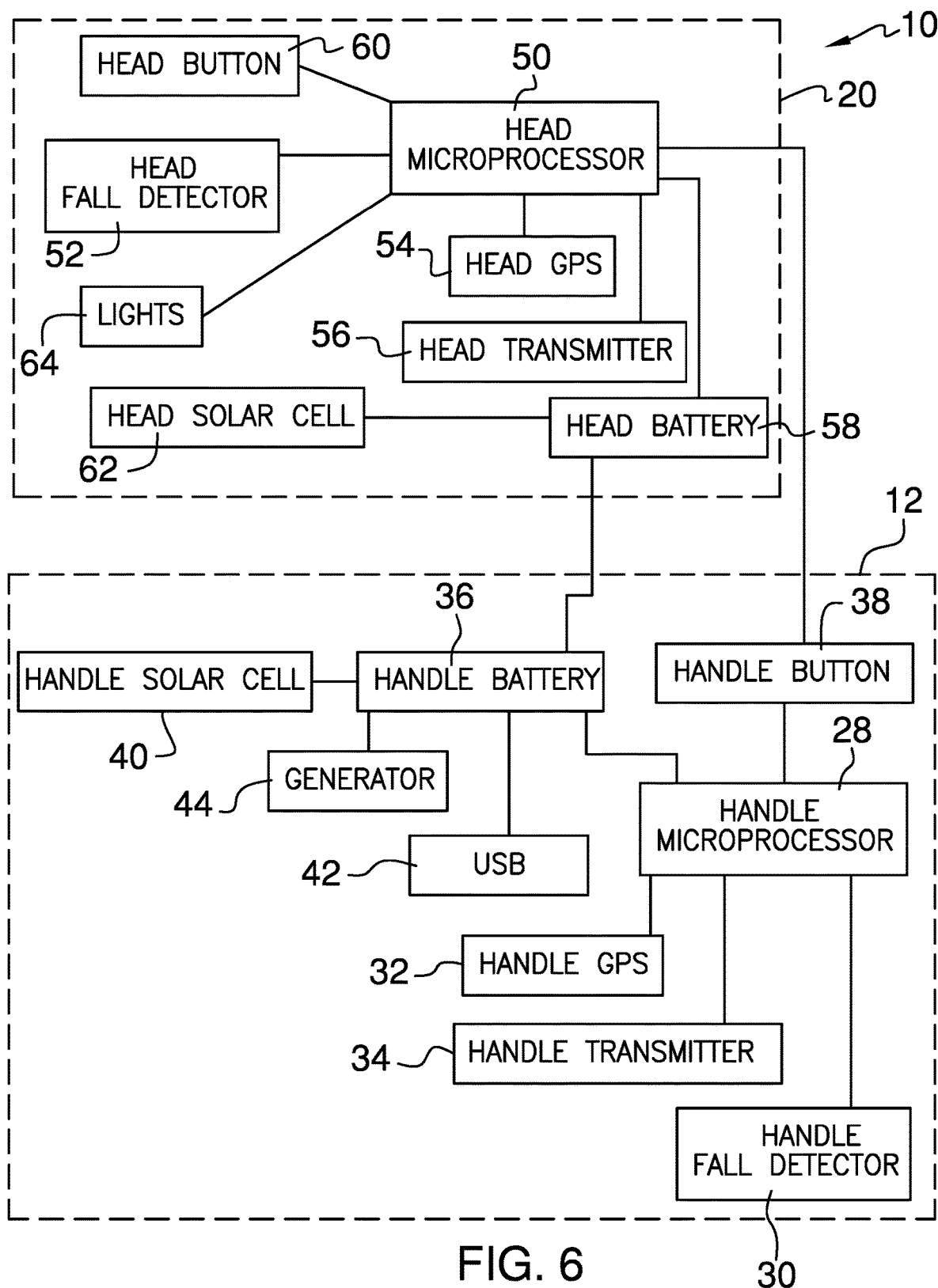
FIG. 6 is a diagram view of an embodiment of the disclosure.
Figure 7:
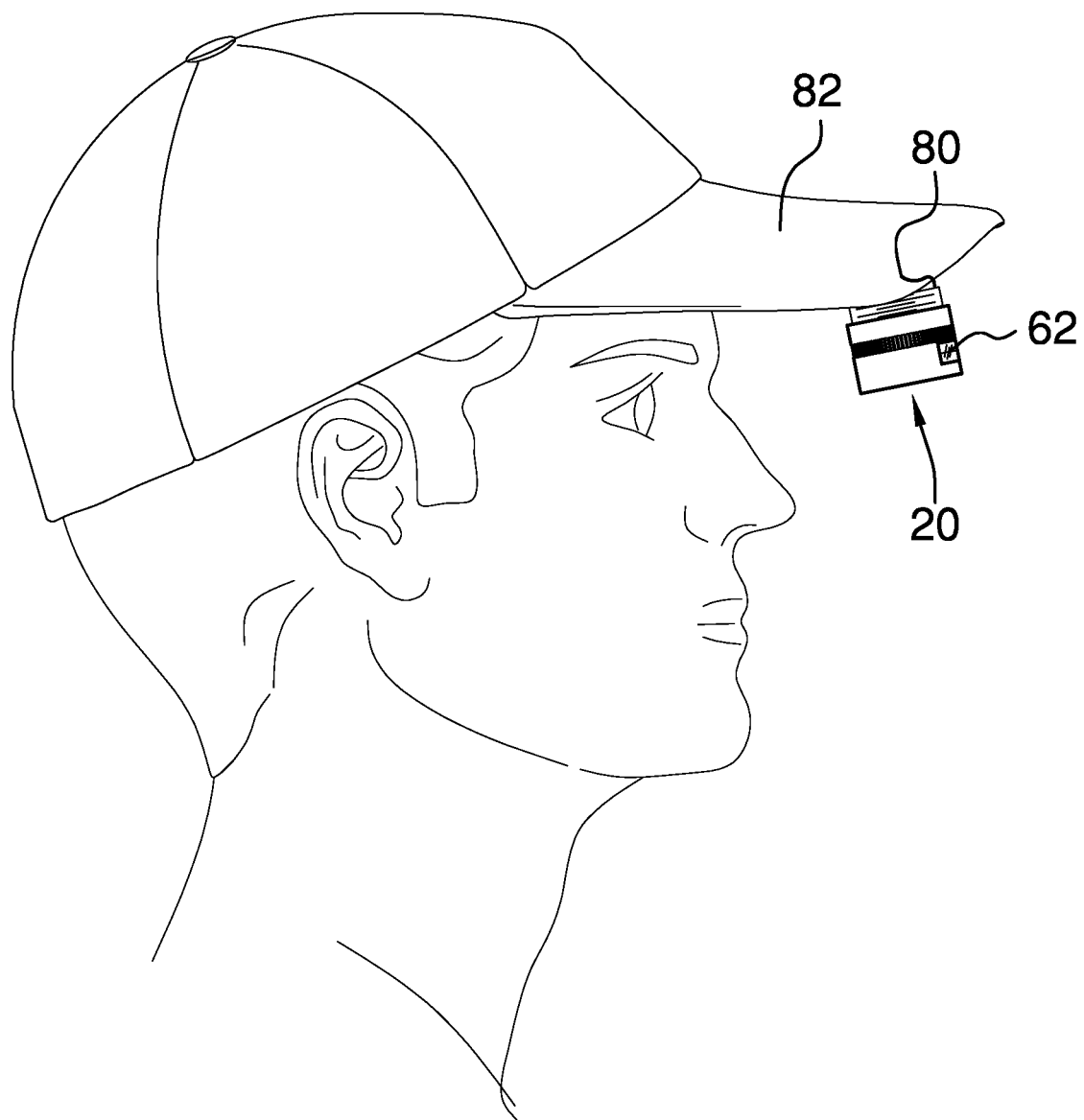
FIG. 7 is an in-use view of a head member of an embodiment of the disclosure.

With reference now to the drawings, and in particular to FIGS. 1 through 7 thereof, a new emergency beacon and light combination assembly embodying the principles and concepts of an embodiment of the disclosure and generally designated by the reference numeral 10 will be described.

As best illustrated in FIGS. 1 through 7, the emergency beacon and light combination assembly 10 generally comprises a hollow handle 12 having a first end 14, a second end 16, and an outer surface 18. The first end 14 of the handle 12 is threaded. A head member 20 is removably attached to the handle 12. The head member 20 is hollow and has a proximal end 22 and a distal end 24, relative to the handle 12 and a perimeter surface 26 extending between proximal 22 and distal 24 ends. The proximal end 22 is threaded such that the head member 20 is threadably couplable to the first end 14 of the handle 12. The head member 20 may alternatively be removably attached to the handle 12 via alternative conventional connectors, such as a latch, a spring-biased catch, or the like.

A handle control circuit 28 is attached to and positioned within the handle 12. A handle accelerometer 30, a handle global positioning system (GPS) module 32, a handle transmitter 34, and a handle power supply 36 comprising a battery are each electrically coupled to the handle control circuit 28 and positioned within the handle 12. A handle power button 38 is operatively coupled to the handle control circuit 28 and positioned on the outer surface 18 of the handle 12.

The handle control circuit 28 is programmed to detect when the handle 12 accelerates a predetermined acceleration threshold, which may be programmed during manufacture or be programmable by a user. The predetermined acceleration threshold corresponds to an acceleration level that is likely to cause injury or incapacitation leading to a need for rescue for a user keeping the beacon 10 on the user's person, which may depend on the intended usage and environment for the beacon 10.

The handle GPS module 32 determines a geographical position of the handle 12 when the handle control circuit 28 emits the handle 12 alarm signal. The handle transmitter 34 sends an alert signal comprising the geographical position of the handle 12 to a receiving device with which the handle transmitter 34 is in communication when the handle control circuit 28 emits the handle 12 alarm signal. The receiving device may be a mobile phone, computer, radio, or other device configured for receiving the alert signal.

A handle solar cell 40 is electrically coupled to the handle power supply 36 and is positioned on the outer surface 18 of the handle 12. A charging port 42 is also electrically coupled to the handle power supply 36 and is mounted on the handle 12. The charging port 42 is positioned on the second end 16 of the handle 12. A generator 44 configured to generate electricity is electrically coupled to the handle power supply 36. The generator 44 is positioned on the handle 12 and is configured to be operated by hand. Each of the handle solar cell 40, the charging port 42, and the generator 44 are configured for selectively charging the power supply. The generator 44 comprises a crank 46 and a gear train 48.

A head control circuit 50 is attached to and positioned within the head member 20. The head control circuit 50 is electrically coupled to the handle power button 38 when the head member 20 is attached to the handle 12. The head control circuit 50 is configured to emit a head alarm signal. A head accelerometer 52, a head GPS module 54, a head transmitter 56, and a head power supply 58 comprising a battery are each electrically coupled to the head control circuit 50 and positioned within the head member 20. A head power button 60 is operatively coupled to the head control circuit 50 and is positioned on the perimeter surface 26 of the head member 20.

The head control circuit 50 is programmed to detect when the head member 20 accelerates above the predetermined acceleration threshold. the head GPS module 54 determines a geographical position of the head member 20 when the head control circuit 50 emits the head alarm signal, and the head transmitter 56 then sends an alert signal comprising the geographical position of the head member 20 to the receiving device.

A head solar cell 62 is electrically coupled to the head power supply 58 and is attached to the perimeter surface 26 of the head member 20. The head power supply 58 is also electrically coupled to said handle power supply 36 when said head member 20 is attached to said handle 12. The head solar cell 62 and the handle power supply 36 are configured for selectively charging the head power supply 58.

A plurality of light emitters 64 is electrically coupled to the head control circuit 50 and positioned within the head member 20. The plurality of light emitters 64 emits one of a plurality of light patterns directionally away from the distal end 24 of the head member 20 when the head control circuit 50 emits the head alarm signal. The plurality of light emitters 64 includes light emitters 64 having different color light emission. In one embodiment the plurality of light emitters includes at least one white light emitting light emitter 66, one red light emitting light emitter 68, one green light emitting light emitter 70, one amber light emitting light emitter 72, and one blue light emitting light emitter 74. A group of outer light emitters 76 of the plurality of light emitters 64 is defined as positioned around a center light emitter 78 of the plurality of light emitters 64, wherein the center light emitter 64 comprises the white light emitter 66. The light emitters 64 will typically comprise light emitting diodes (LEDs) and it should be understood that the LEDs may be capable of each selectively emitting multiple colors. The light patterns will typically include flashing of variously changing colors to attract others to the light emitters 64.

The handle power button 38 and the head power button 60 selectively cause the handle control circuit 28 and the head control circuit 50 to emit alarm signals and activate the light emitters 64 in the following manner. The handle control circuit 28 emits the handle alarm signal when the handle power button 38 is actuated in a predetermined handle alarm actuation sequence, and the head control circuit 50 activates the plurality of light emitters 64 in one of the plurality of light patterns when the handle power button 38 is actuated in a predetermined handle 12 light emitting sequence. The predetermined handle 12 alarm actuation sequence and the predetermined handle 12 light emitting sequence are differentiable from each other. Various differentiable sequences are possible, including actuating the handle power button 38 a different number of times within a period of time or holding the handle power button 38 for different periods of time. Additionally, different light patterns of the plurality of light patterns may be chosen using differentiable handle 12 light emitting sequences. One such light pattern may be a continuously emitted white light for illuminating an environment. Another light pattern may be causing the plurality of light emitters 64 to emit light in transient bursts.

Similarly, the head control circuit 50 emits the head alarm signal when the head power button 60 is actuated in a predetermined head alarm actuation sequence and activates the plurality of light emitters 64 in one of a plurality of light patterns when the head power button 60 is actuated in a predetermined head light emitting sequence. The predetermined head alarm actuation sequence and the predetermined head light emitting sequence are differentiable from each other and may be differentiable using different numbers of actuations within a time period, holding the head power button 60 for different periods of time, or the like. Different light patterns may be actuated by differentiable head light emitting sequences.

A pair of clips 80 is attached to the head member 20 and is configured to removably couple the head member 20 to an article of clothing 82 when the head member 20 is not attached to the handle 12. Each of the pair of clips 80 extends from the proximal end 22 of the head member 20 and turns inwardly, wherein the pair of clips 80 is positioned opposite each other. The clips 80 are used for securing the head member 20 to an article of clothing such as to a person's shirt, jacket, head covering, belt loop or the like. Any conventional clip type structure may be utilized for this purpose.

In use, the emergency beacon and light combination assembly 10 is carried on a user's person and may be used as a conventional flashlight by actuating the handle power button 38 or the head power button. When used as a flashlight, typically one white light will be emitted from light emitters 64. The handle power button 38 and the head power button 60 are actuated as desired using the variety of actuation sequences to emit the alarm signals and the light signals accordingly. The control circuits will also automatically emit the alarm signals when the handle 12 and head member 20 exceed the acceleration thresholds accordingly. The head member 20 may also be removed and operated separately from the handle 12 and may be clipped onto an article of clothing 82 with the pair of clips 80.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency beacon and light combination assembly comprising:
    a handle being hollow and having a first end, a second end, and an outer surface;
    a head member being removably attached to said handle, said head member being hollow and having a proximal end and a distal end relative to said handle, said head member having a perimeter surface;
    a head control circuit being attached to and positioned within said head member;
    a head power supply being electrically coupled to said head control circuit and positioned within said head member;
    a head power button being operatively coupled to said head control circuit and positioned on said perimeter surface of said head member;
    a light emitter being electrically coupled to said head control circuit and positioned within said head member, said head control circuit being programmed to activate said light emitter in one of a plurality of light patterns when said head power button is actuated in a predetermined head light emitting sequence; and
    a clip being attached to said head member and being configured to removably couple said head member to an article of clothing when said head member is not attached to said handle, said clip extending from said proximal end of said head member and turning inwardly.

2. The beacon of claim 1, further comprising said clip being one of a pair of clips.

3. An emergency beacon and light combination assembly comprising:
    a handle being hollow and having a first end, a second end, and an outer surface;
    a head member being removably attached to said handle, said head member being hollow and having a proximal end and a distal end relative to said handle, said head member having a perimeter surface;
    a head control circuit being attached to and positioned within said head member;
    a head power supply being electrically coupled to said head control circuit and positioned within said head member;
    a head power button being operatively coupled to said head control circuit and positioned on said perimeter surface of said head member;
    a light emitter being electrically coupled to said head control circuit and positioned within said head member, said head control circuit being programmed to activate said light emitter in one of a plurality of light patterns when said head power button is actuated in a predetermined head light emitting sequence;
    a clip being attached to said head member and being configured to removably couple said head member to an article of clothing when said head member is not attached to said handle; and
    said first end of said handle being threaded, said proximal end of said head member being threaded such that said head member is threadably couplable to said first end of said handle.

4. An emergency beacon and light combination assembly comprising:
    a handle being hollow and having a first end, a second end, and an outer surface;
    a head member being removably attached to said handle, said head member being hollow and having a proximal end and a distal end relative to said handle, said head member having a perimeter surface;
    a head control circuit being attached to and positioned within said head member;
    a head power supply being electrically coupled to said head control circuit and positioned within said head member;
    a head power button being operatively coupled to said head control circuit and positioned on said perimeter surface of said head member;
    a light emitter being electrically coupled to said head control circuit and positioned within said head member, said head control circuit being programmed to activate said light emitter in one of a plurality of light patterns when said head power button is actuated in a predetermined head light emitting sequence;
    a clip being attached to said head member and being configured to removably couple said head member to an article of clothing when said head member is not attached to said handle;
    a head accelerometer being electrically coupled to said head control circuit and positioned within said head member, said head control circuit being programmed to detect when said head member accelerates above a predetermined acceleration threshold, said head control circuit being programmed to emit a head alarm signal when said head member accelerates above said predetermined acceleration threshold; and
    a head transmitter being electrically coupled to said head control circuit and positioned within said head member, said head transmitter being in communication with a receiving device, said head transmitter sending an alert signal to the receiving device when said head control circuit emits said head alarm signal.

5. The beacon of claim 4, further comprising a head global positioning system (GPS) module being electrically coupled to said head control circuit and positioned within said head member, said head GPS module determining a geographical position of said head member when said head control circuit emits said head alarm signal, said alert signal send by said head transmitter comprising said geographical position of said head member.

6. The beacon of claim 4, further comprising said head control circuit being configured to emit said head alarm signal when said head power button is actuated in a predetermined head alarm actuation sequence.

7. The beacon of claim 4, further comprising said head control circuit being programmed to activate said light emitter in one of said plurality of light patterns when said head control circuit emits said head alarm signal.

8. The beacon of claim 1, further comprising a head solar cell being electrically coupled to said head power supply and being attached to said perimeter surface of said head member.

9. The beacon of claim 1, further comprising said light emitter being one of a plurality of light emitters, said plurality of light emitters including at least one white light emitting light emitter, one red light emitting light emitter, one green light emitting light emitter, one amber light emitting light emitter, and one blue light emitting light emitter.

10. The beacon of claim 9, further comprising a group of outer light emitters of said plurality of light emitters being defined as positioned around a center light emitter of said plurality of light emitters, wherein said center light emitter comprises said white light emitter.

11. An emergency beacon and light combination assembly comprising:
- a handle being hollow and having a first end, a second end, and an outer surface;
- a head member being removably attached to said handle, said head member being hollow and having a proximal end and a distal end relative to said handle, said head member having a perimeter surface;
- a head control circuit being attached to and positioned within said head member;
- a head power supply being electrically coupled to said head control circuit and positioned within said head member;
- a head power button being operatively coupled to said head control circuit and positioned on said perimeter surface of said head member;
- a light emitter being electrically coupled to said head control circuit and positioned within said head member, said head control circuit being programmed to activate said light emitter in one of a plurality of light patterns when said head power button is actuated in a predetermined head light emitting sequence;
- a clip being attached to said head member and being configured to removably couple said head member to an article of clothing when said head member is not attached to said handle;
- a handle control circuit being attached to and positioned within said handle;
- a handle accelerometer being electrically coupled to said handle control circuit and positioned within said handle, said handle control circuit being programmed to detect when said handle accelerates above a predetermined acceleration threshold, said handle control circuit being programmed to emit a handle alarm signal when said handle accelerates above said predetermined acceleration threshold;
- a handle transmitter being electrically coupled to said handle control circuit and positioned within said handle, said handle transmitter being in communication with a receiving device, said handle transmitter sending an alert signal to the receiving device when said handle control circuit emits said handle alarm signal; and
- a handle power supply being electrically coupled to said handle control circuit and positioned within said handle.

12. The beacon of claim 11, further comprising a handle global positioning system (GPS) module being electrically coupled to said handle control circuit and positioned within said handle, said handle GPS module being in communication with a satellite navigation system, said handle GPS module determining a geographical position of said handle when said handle control circuit emits said handle alarm signal, said alert signal sent by said handle transmitter comprising said geographical position of said handle.

13. The beacon of claim 11, further comprising said head power supply being electrically coupled to said handle power supply when said head member is attached to said handle.

14. The beacon of claim 11, further comprising a handle power button being operatively coupled to said handle control circuit and positioned on said outer surface of said handle, said handle control circuit being configured to emit said handle alarm signal when said handle power button is actuated in a predetermined handle alarm actuation sequence.

15. The beacon of claim 14, further comprising said head control circuit being programmed to activate said light emitter in one of said plurality of light patterns when said handle power button is actuated in a predetermined handle light emitting sequence while being electrically coupled to said head control circuit.

16. The beacon of claim 11, further comprising a handle solar cell being electrically coupled to said handle power supply and being positioned on said outer surface of said handle.

17. The beacon of claim 11, further comprising a charging port being electrically coupled to said handle power supply, said charging portion being mounted on said handle, said charging port being positioned on said second end of said handle.

18. The beacon of claim 11, further comprising a generator configured to generate electricity being electrically coupled to said handle power supply, said generator being positioned on said handle, said generator being configured to be operated by hand.

19. An emergency beacon and light combination assembly comprising:
- a handle being hollow and having a first end, a second end, and an outer surface, said first end of said handle being threaded;
- a head member being removably attached to said handle, said head member being hollow and having a proximal end and a distal end relative to said handle, said head member having a perimeter surface, said proximal end being threaded such that said head member is threadably couplable to said first end of said handle;
- a handle control circuit being attached to and positioned within said handle;
- a handle accelerometer being electrically coupled to said handle control circuit and positioned within said handle, said handle control circuit being programmed to detect when said handle accelerates above a predetermined acceleration threshold, said handle control circuit being programmed to emit a handle alarm signal when said handle accelerates above said predetermined acceleration threshold;
- a handle global positioning system (GPS) module being electrically coupled to said handle control circuit and positioned within said handle, said handle GPS module being in communication with a satellite navigation system, said handle GPS module determining a geographical position of said handle when said handle control circuit emits said handle alarm signal;

a handle transmitter being electrically coupled to said handle control circuit and positioned within said handle, said handle transmitter being in communication with a receiving device, said handle transmitter sending an alert signal comprising said geographical position of said handle to the receiving device when said handle control circuit emits said handle alarm signal;

a handle power button being operatively coupled to said handle control circuit and positioned on said outer surface of said handle, said handle control circuit being configured to emit said handle alarm signal when said handle power button is actuated in a predetermined handle alarm actuation sequence;

a handle power supply being electrically coupled to said handle control circuit and positioned within said handle, said handle power supply comprising a battery;

a handle solar cell being electrically coupled to said handle power supply and being positioned on said outer surface of said handle;

a charging port being electrically coupled to said handle power supply, said charging portion being mounted on said handle, said charging port being positioned on said second end of said handle;

a generator configured to generate electricity being electrically coupled to said handle power supply, said generator being positioned on said handle, said generator being configured to be operated by hand;

a head control circuit being attached to and positioned within said head member, said head control circuit being electrically coupled to said handle power button when said head member is attached to said handle, said head control circuit being configured to emit a head alarm signal;

a head accelerometer being electrically coupled to said head control circuit and positioned within said head member, said head control circuit being programmed to detect when said head member accelerates above said predetermined acceleration threshold, said head control circuit being programmed to emit said head alarm signal when said head member accelerates above said predetermined acceleration threshold;

a head global positioning system (GPS) module being electrically coupled to said head control circuit and positioned within said head member, said head GPS module being in communication with said satellite navigation system, said head GPS module determining a geographical position of said head member when said head control circuit emits said head alarm signal;

a head transmitter being electrically coupled to said head control circuit and positioned within said head member, said head transmitter being in communication with the receiving device, said head transmitter sending an alert signal comprising said geographical position of said head member to the receiving device when said head control circuit emits said head alarm signal;

a head power button being operatively coupled to said head control circuit and positioned on said perimeter surface of said head member, said head control circuit being configured to emit said head alarm signal when said head power button is actuated in a predetermined head alarm actuation sequence;

a head power supply being electrically coupled to said head control circuit and positioned within said head member, said head power supply comprising a battery, said head power supply being electrically coupled to said handle power supply when said head member is attached to said handle;

a head solar cell being electrically coupled to said head power supply and being attached to said perimeter surface of said head member;

a plurality of light emitters being electrically coupled to said head control circuit and positioned within said head member, said plurality of light emitters emitting one of a plurality of light patterns directionally away from said distal end of said head member when said head control circuit emits said head alarm signal, said plurality of light emitters including at least one white light emitting light emitter, one red light emitting light emitter, one green light emitting light emitter, one amber light emitting light emitter, and one blue light emitting light emitter, a group of outer light emitters of said plurality of light emitters being defined as positioned around a center light emitter of said plurality of light emitters, wherein said center light emitter comprises said white light emitter;

said head control circuit being programmed to activate said plurality of light emitters in one of said plurality of light patterns when either said head power button is actuated in a predetermined head light emitting sequence or said handle power button is actuated in a predetermined handle light emitting sequence while being electrically coupled to said head control circuit; and a pair of clips being attached to said head member and being configured to removably couple said head member to an article of clothing when said head member is not attached to said handle, each of said pair of clips extending from said proximal end of said head member and turning inwardly, said pair of clips being positioned opposite each other.

* * * * *